Patented Oct. 8, 1940

2,216,735

UNITED STATES PATENT OFFICE 2,216,735

PHOTOGRAPHIC FILM

Wallace Hume Carothers, deceased, late of Wilmington, Del., by the Wilmington Trust Company, executor, Wilmington, Del., assignor to E. I. du Pont de Nemours & Company, Wilmington, Del., a corporation of Delaware No Drawing. Application September 27, 1938, Serial No. 232,011

10 Claims. (Cl. 95—9)

This invention relates to films useful in photographic processes and more particularly to new and improved photographic films comprising certain synthetic polymers carrying a light-sensitive layer or layers.

This application is a continuation in part of application Serial Number 232,012, filed of even date herewith.

Photographic films have heretofore been made almost exclusively from cellulose derivatives. Of these derivatives nitrocellulose, in spite of its fire hazard, has been used most extensively. Although cellulose acetate has replaced nitrocellulose in certain types of film, this material has relatively low water-resistance, and poor strength and flexibility, especially at low humidities. This lack of flexibility with consequent tendency to breakage and wear is particularly undesirable in the case of moving picture film. The necessity of using thick films to compensate for poor strength is not only an economic disadvantage but is also detrimental in color photography due to the image distortion caused by relatively wide separation of the emulsions applied to opposite sides of the film. It will be apparent, therefore, that there is a demand for a non-inflammable photographic film which is not subject to the limitations of cellulose acetate films.

This invention has as its object the production of a new and improved photographic film. A further object is to provide a photographic film which has a low fire hazard and which has good strength, durability, dimensional stability, and flexibility. Other objects will appear hereinafter.

These objects are accomplished by coating with a light-sensitive (radiation-sensitive) material a film derived from a synthetic linear polyamide. More particularly the invention comprises a light-sensitive film element composed of a support of fiber-forming linear polyamide in which the amide groups form an integral part of the main chain of atoms, and a light-sensitive layer or layers of photographic silver halide emulsion.

The polyamides used in the practice of this invention are members of the class of fiber-forming synthetic linear polymers obtainable from bifunctional reactants as described in Patents 2,071,250, 2,071,251, and 2,071,253. These polyamides are of two types, namely, those obtainable from polymerizable monoaminomonocarboxylic acids or their amide-forming derivatives, and those obtainable from the reaction of suitable diamines with dicarboxylic acids or amide-forming derivatives thereof. In general, the synthetic linear polyamides do not exhibit fiber-forming properties unless their intrinsic viscosity is above 0.4 where intrinsic viscosity is defined as $$\frac{\log_e N_r}{C}$$

wherein $N_r$ is the viscosity of a dilute metacresol solution of the polyamide divided by the viscosity of metacresol in the same units and at the same temperature and C is the concentration in grams of polyamide per 100 cc. of solution. On hydrolysis with hydrochloric acid, these polyamides revert to the reactants from which they are derived, the amino derivatives being obtained in the form of the hydrochlorides. In the case of the diamine-dibasic carboxylic acid type polyamides, there is obtained upon hydrolysis with hydrochloric acid a diamine hydrochloride and a dibasic carboxylic acid. Excluding the effects of small variations in molecular weight and the reactants used in their preparation, the polyamides are characterized by the fact that they yield oriented products on cold drawing (application of tensile stress), as for instance, in the case of filaments, or cold working (application of compressive stress) as in the cold rolling of films, ribbons, sheets, and the like. Cold rolling improves the toughness, stiffness, the modulus of elasticity, and the tensile strength of the products. These polyamides, in common with other fiber-forming synthetic linear polymers, are microcrystalline in character as evidenced by their sharp melting point, and the nature of the diffraction pattern which they furnish on X-ray examination.

Since the polyamides melt sharply, and without appreciable decomposition, it is possible to form the film base, or sheets from which the films are cut, directly from the molten polymers. In order to insure the uniform production of clear films, the films obtained from the molten polymers are preferably tempered by rapidly chilling. For this purpose the polymer can be extruded as a sheet into a cooling atmosphere or into a suitable quenching liquid, such as water or other inert non-solvent for the polyamide. For example, the polymer can be cast in sheet form onto a cool metal surface; or it can be formed into a sheet by rolling between metal rolls.

In many instances it is found advantageous to subject the films thus formed to one or more operations designed to improve the physical properties of the films. One such operation is that of "cold working", previously referred to, wherein compressive stress is applied to the solid polymer, causing it to flow in a preferred direction. A convenient method for carrying out the process of cold working consists in passing the film of the polymer between "cold rolls," i. e., at temperatures substantially below the melting point of the polymer. Another operation ("setting") often found of value consists in subjecting the films under tension to the action of heat with or without simultaneous action of a non-solvent mild swelling agent for the polymer, e. g., water, steam or alcohol, and allowing it to cool under the continued application of tension.

In the preferred embodiment of the invention the polyamide film is formed by extrusion into a "tempering" bath, followed, if desired, by the operations of cold rolling and setting as described in Example I. These operations lead to a strong, flexible, smooth, continuous transparent product. Upon this support light-sensitive layers are coated by methods known to those skilled in the art. The light-sensitive layer generally consists of a gelatino-silver halide emulsion of a type used in modern photographic practice.

The following examples, in which the quantities are stated in parts by weight, illustrate the invention more specifically.

Example I

Polyhexamethylene adipamide, of intrinsic viscosity 1.12, was extruded through forming rolls into cold water. The resulting film had a thickness of 0.014" and was translucent. It was then passed three times through polished steel cold rolls, traveling at an even speed, at which time the thickness had been reduced to 0.007" and the film was transparent. The film was then steamed for two hours at 100° C. under tension and allowed to dry (also under tension). The film was then coated with a gelatin-silver bromide emulsion containing approximately 16% solids. The emulsion also contained 0.02% sodium 3,9-diethyltridecyl-6-sulfate and 2% dimethylformamide, added to improve the anchorage. The film was slit to a width of 35 mm. and perforated. After exposure and development the film was projected 500 times without sign of breaking, as compared with a cellulose nitrate film of 0.006" thickness which broke after 300 projections. A cellulose acetate film of 0.0055" thickness broke before 100 projections.

This coated film when held in a flame burned with great difficulty. It melted into globules and ceased to support combustion immediately upon removal from the flame, whereas under similar treatment a cellulose nitrate film burned violently.

Example II

A film of polyhexamethylene adipamide, prepared from a polymer of intrinsic viscosity 1.01, by extrusion into cold water, was cold rolled from a thickness of 0.023" to a thickness of 0.0064" and steamed at 100° C. for three hours under tension. The resultant film had a longitudinal tensile strength of 50,050 lbs./sq. in. and a latitudinal tensile strength of 16,500 lbs./sq. in., calculated on the break dimensions. After coating with a subcoat containing the following ingredients:

| | Parts |
|---|---|
| Gelatin | 5 |
| Glycerol-1,3-dichlorhydrin | 30 |
| Phenol | 6 |
| Methanol | 224 |
| Acetone | 440 |
| Formaldehyde | 0.6 | and drying, the film was coated with a positive-type silver-gelatino-halide emulsion, then exposed, developed, and fixed. This film was projected 1200 times without a sign of breaking or wear.

Example III

An interpolymer prepared by heating equimolecular proportions of the adipic acid salt of hexamethylene diamine and the sebacic acid salt of decamethylene diamine for three hours under condensation polymerization conditions at 260° C. was cast into a film by extrusion into cold water and found to be transparent without further treatment. The polymer had an intrinsic viscosity of 1.1 and the film had a tensile strength of 8100 lbs./sq. in. based on the original dimensions, and a tensile strength of 38,000 lbs./sq. in. calculated on the break dimensions. This film was then subcoated with a mixture of 50 parts of cellulose acetate-gelatin subcoat, comprising a solution containing 1.8% gelatin and acetone, methyl alcohol, water and acetic acid in suitable proportions, and 15 parts chloroform, and then coated with a gelatin silver halide emulsion. The film was found to be very strong, of excellent resistance to flexing, and of higher water-resistance than polyhexamethylene adipamide. A small piece of the coated film, held in a flame, melted without burning.

The effect of intrinsic viscosity and thickness upon projector wear resistance are indicated in the following tables. Table I refers to films 16 mm. in width and Table II refers to films 35 mm. in width.

TABLE I
*Projector wear on 16 mm. film*

| Film | Thickness (thousandths of an inch) | Intrinsic viscosity | Number of projections to break |
|---|---|---|---|
| Polyhexamethylene adipamide | 4.5 | 1.05 | *600 |
| Do | 4.1 | 1.05 | *600 |
| Do | 4.0 | 1.05 | *760 |
| Do | 4.0 | 0.94 | *500 |
| Do | 3.6 | 1.06 | 260 |
| Do | 3.0 | 0.70 | 120 |
| Do | 2.85 | 1.06 | *740 |
| Cellulose acetate | 5.6 | | 120-150 |

*Film was not broken at this number of projections.

TABLE II
*Projector wear on 35 mm. film*

| Film | Thickness (thousandths of an inch) | Intrinsic viscosity | Number of projections to break |
|---|---|---|---|
| Polyhexamethylene adipamide | 7.5 | 0.98 | *2050 |
| Do | 7.5 | 0.98 | *2050 |
| Do | 6.2 | 0.98 | *2050 |
| Do | 6.0 | 0.98 | *2050 |
| Do | 5.3 | 1.14 | 837 |
| Do | 4.7 | 1.05 | 1559 |
| Do | 4.1 | 1.14 | 203 |
| Do | 3.7 | 1.07 | 184 |
| Do | 3.0 | 1.06 | 80 |
| Cellulose nitrate | 6.0 | | 250 |
| Cellulose acetate | 5.5 | | 60 |

*Film was not broken at this number of projections.

Other types of synthetic linear polyamides can be employed in addition to those cited above. A valuable class of polyamides for the preparation of photographic films is that obtainable by condensation polymerization from one or more diamines of formula $NH_2CH_2RCH_2NH_2$ and one or more dicarboxylic acids of formula $$HOOCCH_2R'CH_2COOH$$

or amide-forming derivatives thereof, in which

R and R' are divalent hydrocarbon radicals free from olefinic and acetylenic unsaturation and in which R has a chain length of at least two carbon atoms. An especially valuable group of polyamides within this class are those in which R is $(CH_2)_x$ and R' is $(CH_2)_y$, wherein $x$ and $y$ are integers and $x$ is at least 2. As examples of polyamides which fall within one or both of these groups might be mentioned polytetramethylene adipamide, polytetramethylene suberamide, polypentamethylene adipamide, polyhexamethylene adipamide, poly-3-methyl-hexamethylene adipamide, polyhexamethylene-β-methyl adipamide, polyhexamethylene sebacamide, polyoctamethylene adipamide, polydecamethylene adipamide, polydecamethylene p-phenylene diacetamide, and poly-p-xylylene sebacamide, as well as copolymers derived from reactants of the type represented in these polyamides. As examples of useful polyamides falling outside of these classes might be mentioned polyphenylene sebacamide and the polymer derived from γ,γ'-diaminodipropyl ether and adipic acid. Polyamides obtained from polymerizable monoaminomonocarboxylic acids may also be used, typical examples being those obtainable from 6-aminocaproic acid, 9-aminononanoic acid, and 11-aminoundecanoic acid, as well as interpolymers derived from a mixture of polymerizable monoaminomonocarboxylic acids. Interpolymers derived from amino acids, diamines, and dibasic acids may also be employed.

The polyamide film base may also be prepared from solutions. Polyamides derived from straight chain (polymethylene) polyamide-forming reactants, although in general relatively insoluble in the more common solvents, are soluble in phenol and usually in the lower members of the fatty acid series, such as formic and acetic acids. Films can therefore be prepared by flowing solutions or emulsions of the polyamides on a suitable surface, e. g., glass, and evaporating the solvent, or by regenerating the solvent in films formed by extruding a solution of the polyamide through a slit orifice or between rolls into a suitable coagulating bath. Certain polyamides, e. g., those containing hydrocarbon substituents and interpolyamides, are more soluble than those of the simple polymethylene type, and in many cases are soluble in alcohols or alcohol-chlorinated hydrocarbon mixtures. These polymers are easily obtained in film form by solvent evaporation procedures.

The film used in the preparation of the light-sensitive film elements of this invention need not necessarily consist solely of fiber-forming synthetic linear polyamides. It is frequently desirable to use softening or plasticizing agents in conjunction with the polymers. As examples of suitable plasticizers for this purpose there might be mentioned phenols, e. g., o-hydroxydiphenyl, diphenylolpropane, and diamyl phenol; and sulfonamides, e. g., N-ethyl-p-toluene sulfonamide; and certain types of compatible resinous materials. The addition of plasticizer tends to make the film more flexible and frequently improves the clarity.

The light-sensitive layer or layers, as stated above, preferably consist of a gelatino-silver halide emulsion. It may, however, be composed of any light-sensitive combination of materials such as bichromated hydrophilic colloids, e. g., albumen, gelatin, gum Arabic, or glue in conjunction with ammonium bichromate. In addition, the light-sensitive compound may be contained in mixtures of hydrophilic, reversible protein colloids and water-dispersible derivatives of cellulose such as cellulose diglycollate, sodium cellulose glycollate, water-soluble synthetic resins and gums such as polyvinyl alcohol and gum Arabic. For photomechanical films such mixtures of carriers for the light-sensitive compounds are particularly useful. The light-sensitive layer or layers may also consist of iron salts or mixtures of light-sensitive diazonium compounds and coupling components. Furthermore, there may be a plurality of light-sensitive layers arranged on one or both faces of the support as is common in certain processes of color photography. The films contemplated in the present invention may also bear a photographically-produced sound track. In many cases it is found advisable to dye or tint the support or to provide it with an antistatic, antihalation layer or layers provided with a removable light-obstructive material absorptive of all colors which affect the light-sensitive coating.

The films of the present invention may be made up of fiber-forming synthetic linear polyamides either wholly or in part. In some cases it is found advantageous to coat one or both sides of the support with other polymeric materials, for example cellulose acetate, nitrocellulose, esters and acetals of polyvinyl alcohol, polyvinyl chloride, polyhydric alcohol-polybasic acid resins and ethyl cellulose. Surprisingly it has been found that the adhesion between cellulose nitrate and polyamides is particularly good. More frequently, however, it is advantageous to coat the surfaces of film bases prepared from these other polymeric materials with polyamide. In certain cases it has also been found advantageous to prepare a film of more than one fiber-forming synthetic linear polyamide.

The fiber-forming synthetic linear polyamides may be used to impart their desirable properties to other polymers by means of surface coating. Thus the fire hazard of cellulose nitrate films is substantially lowered by surface coating with one of the polymers herein described, for example polyhexamethylene adipamide. A similar coating of cellulose acetate films leads to a surprising improvement in flexibility and water resistance.

Splicing of the films can be readily accomplished by the application of solvents and pressure at normal or elevated temperatures. The choice of solvents is of course dictated by the particular polymer employed. For examples, "positive" film having a polyamide base is spliced by application of pressure to the overlapped ends to be joined after coating them with a splicing solution comprising a major proportion of phenol or formic acid, or by melting them together in the absence of splicing solution by the application of heat and pressure. Under these conditions a strong bond with marked resistance to flexing is obtained.

The polyamide films used as supports may be of different thicknesses depending upon the use to which the finished article is to be put. As may be seen from the tables, certain polymers can be formed into films considerably thinner than was previously known in the art without suffering a decrease in resistance to wear. The preferred thickness varies with the nature of the synthetic linear polyamide chosen.

The photographic films of this invention possess many outstanding advantages. They are characterized by extreme strength, good flexibility, good water-resistance, and absence of fire hazard, a combination of properties not possessed by the nitrocellulose or cellulose acetate films. The great strength of the present films manifests itself, in the case of cinematographic films, in a large increase in the life of films continually exposed to the wear of projection. A further manifestation of this strength is the fact that it is possible to use films of the order of 0.002" to 0.003" thickness, which is in the order of one-half of the thickness of the films previously used, without decreasing the wear resistance of the film element. This is not only an economic advantage but also an advantage in utility and convenience since it is possible to prepare photographic films of less weight and to increase the footage per roll. These properties likewise render the polyamides of advantage in the preparation of film leaders which are subject to considerably more wear than the cinematographic film itself. Furthermore, the use of thin films is of extreme practical importance in connection with processes of color photography for it makes feasible the coating of emulsions on opposite sides of the support without causing distortion of the subsequent picture due to the intervening layer of film base. This unique property makes the films of the present invention specially advantageous in the preparation of films for color photography. In place of multilayer coatings on a single film base, thin films of the herein described polyamides may be used in a tripack arrangement of films where image distortion due to the separation of two of the sensitive emulsions by one of the film bases is reduced to a surprising minimum by the use of these thin films.

Extremely thin films of these polyamides make possible stripping emulsion films and papers, particularly useful in the photomechanical and color photography fields. For example, a double-weight, photographic paper stock, water-proofed in the well known manner, is coated on one side with a water-soluble agglutinant such as refined glue or casein. When partially dry, the agglutinant surface is brought into contact with a similarly coated agglutinant surface of a thin film of a polyamide approximately 0.0008" in thickness. The laminated combination is held under pressure until the cementation of the agglutinant is firm and then dried. After drying, the film surface is subbed as indicated in the previous examples and then coated with a layer of a silver-gelatino-halide emulsion. After exposure, developing, fixing and, if desired, subsequent coloring, the emulsion layer and its thin support can be subbed while wet from the temporary paper base and transferred to a permanent support.

The flexibility of the films of the present invention is strikingly demonstrated when measurements are made at low relative humidities. Thus cellulose acetate film at 70% relative humidity withstands about 25 bends in the Pfund flexometer and at 0% relative humidity about 10-15 bends. On the other hand, polyhexamethylene adipamide films are not affected by 250 flexes at either degree of relative humidity. This indifference to atmospheric conditions means that the films of the present invention need not be stored under carefully adjusted conditions as is done with cellulose acetate. This unique property makes them specially advantageous as permanent business, library, and historical records. The absence of plasticizers and residual solvents likewise leads to a more stable film for preparing permanent records.

The relatively high water-resistance of the films of this invention and the advantages of this property in the manufacture of improved photographic films will be apparent upon comparison of the present films with cellulose acetate films. The low water-resistance of cellulose acetate film manifests itself mainly in two ways. First, during the drying operation after coating, the cellulose acetate film rapidly absorbs a relatively large amount of water from the emulsion, causing non-uniformities, streaks and splotches, in the emulsion coat. Second, the sensitivity of cellulose acetate to water leads to deformation of the film itself, in coating and in processing. The films of the present invention are relatively free from these defects. Even under conditions of high humidity the films absorb water surprisingly slowly and show only negligible changes in dimensions. Therefore deformation during coating and processing is practically unknown. These films having practically no distortion or deformation due to rapid water absorption are particularly useful for photographic supports for films used in the graphic arts where distortion of image due to linear or area changes in the film base must be at a minimum. As an additional advantage, the strength of a polyamide film when wet is not appreciably less than that of the dry film.

The water-resistance of the films of the present invention is also manifested in a resistance to hydrolysis. This fact is of extreme importance in films used in color photography where it is recognized that slow hydrolysis of the common cellulose esters leads to a degradation of the dyes employed in forming the colors. Due to the absence of such hydrolysis, these films insure permanence of the images prepared thereon and thus lead the way to the preparation of films for documentary records ensuring the stability of the image after long periods of storage. This is also true for films bearing silver images.

The films of this invention, as has been pointed out above, burn with great difficulty and, even when placed in a flame, show none of the violent burning associated with cellulose nitrate. In most cases the films melt into globules of polymer which burn very slowly or not at all and, when removed from the flame, die out spontaneously.

It will be apparent from the foregoing description that the new photographic films described herein possess a combination of properties ideally suited for their use as supports for light-sensitive or radiation-sensitive layers. No limitations appear to exist upon their use in the photographic and photomechanical industries. That is, they can be used with the advantages outlined above in cut or roll film, in amateur and professional cinematography, the permanent recording of documents, X-ray diagnosis, color photography, and sound recording.

As many apparently widely different embodiments of this invention may be made without departing from the spirit and scope thereof, it is to be understood that the invention is not limited to the specific embodiments thereof except as defined in the appended claims.

What is claimed is:

1. A water-resistant motion picture film of low fire hazard which comprises a perforated smooth, continuous, transparent film base of synthetic linear polyamide carrying a photographic light sensitive layer, said motion picture film being substantially indifferent to atmospheric conditions of temperature and humidity, highly flexible and capable of withstanding without breaking a large number of repeated flexings at low relative humidity, capable of withstanding a substantially larger number of projections than cellulose acetate film of comparable thickness, and being further characterized by substantial freedom of said base from hydrolysis under conditions encountered in practice, and by high permanence on aging of the images formed in said sensitive layer.

2. A water-resistant photographic film of low fire hazard which is substantially indifferent to atmospheric conditions, which is adapted for color photography of the type producible by color coupling, and which is characterized by substantial freedom of hydrolysis under conditions encountered in practice, and by high permanence upon aging of colored dye images carried by the film, said photographic film comprising a smooth, continuous, transparent film base of synthetic linear polyamide carrying a plurality of photographic light sensitive layers.

3. A photographic film of low fire hazard comprising a smooth, continuous, film base of synthetic linear polyamide and a photographic sensitive layer carried by said base, said photographic film being substantially indifferent to atmospheric conditions of temperature and humidity, and characterized by substantial freedom of said base from hydrolysis under conditions encountered in practice, and by high permanence on aging of the images formed in said sensitive layer.

4. The photographic film set forth in claim 3 in which said polyamide is polyhexamethylene adipamide.

5. The photographic film set forth in claim 3 in which said polyamide is the reaction product of a polyamide-forming composition comprising a polyamide-forming reactant containing at least 8 carbon atoms.

6. The photographic film set forth in claim 3 in which said polyamide contains an aromatic ring.

7. The photographic film set forth in claim 3 in which said polyamide is polyhexamethylene sebacamide.

8. The photographic film set forth in claim 3 in which said polyamide is poly-p-xylylene sebacamide.

9. The photographic film set forth in claim 3 in which said film base exhibits molecular orientation.

10. The photographic film set forth in claim 3 in which said photographic sensitive layer is a gelatin silver halide layer.

WALLACE HUME CAROTHERS,
By ELWYN EVANS,
For the Wilmington Trust Company, Executor of the Estate of Wallace Hume Carothers, Deceased.